United States Patent Office 3,335,181
Patented Aug. 8, 1967

3,335,181
AMMONOLYSIS OF 2-HALO-2'-BENZOYL-4'-NITROACETANILIDES
Antonino Focella, Clifton, and Albert Israel Rachlin, Hackensack, N.J., assignors to Hoffmann-La Roche Inc., Nutley, N.J., a corporation of New Jersey
No Drawing. Filed Apr. 17, 1964, Ser. No. 360,755
3 Claims. (Cl. 260—562)

This invention relates to novel chemical methods. More particularly, the present invention relates to a novel procedure for the preparation of 7-nitro-3H-1,4-benzodiazepin-2(1H)-ones, which compounds are useful inter alia as sedatives, muscle relaxants and anti-convulsants.

Prior art procedures for the preparation of 7-nitro-3H-1,4-benzodiazepin-2(1H)-ones are known. However, such procedures, particularly when ultilized under other than laboratory conditions in an attempt to prepare commercially significant amounts of the desired 7-nitro compounds, have shown themselves unsuitable to satisfactorily effect the desired end, since they result in poor yields of low quality product.

It is, accordingly an object of the present invention to provide a method for the facile technical production of the above 7-nitro-3H-1,4-benzodiazepin-2(1H)-ones.

It is a further object of the present invention to provide an efficient process for the facile production of high quality 7-nitro-3H-1,4-benzodiazepin-2(1H)-ones in good yields.

In achieving the objectives of the present invention, a process has been devised which comprises two stages, the first stage being of significant importance in the efficient preparation on a large scale, of the desired good quality 7-nitro end products.

In the first stage of the process of the present invention, a compound of the formula

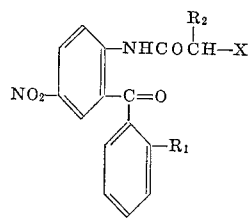

I wherein $R_1$ is selected from the group consisting of hydrogen, trifluoromethyl and halogen; $R_2$ is selected from the group consisting of lower alkyl and hydrogen and; X is selected from the group consisting of chlorine, bromine and iodine is treated with ammonia gas in the presence of a solvent in which ammonia is sparingly soluble whereby to form a compound of the formula

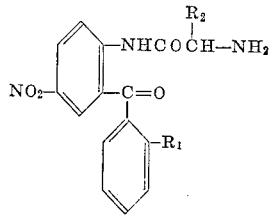

II wherein $R_1$ and $R_2$ are as above. In the preferred embodiment, X in formula I above is bromine.

While prior art procedures have utilized ammoniacal solutions to effect the amination of the compounds corresponding to Formula I above, such procedures, as is noted above, have not shown themselves to be entirely satisfactory from an industrial point of view since poor yields of the desired 7-nitro end products are obtained.

Furthermore, the desired end products resulting from such preparative procedures are contaminated by various unwanted side products which requires time-consuming purification procedures to be separated. Thus, it is readily apparent that before the said 7-nitro compounds can be prepared efficiently on a large scale, a process is necessary which does not suffer from the defects of providing an end product of poor quality in low yield.

The present applicants have cured such defects inherent in prior art procedures with their discovery that in preparing 7-nitro benzodiazepines, the reaction proceeds to a good yield of a high quality product when a minimal amount of ammonia is utilized in the ammonolysis of compounds of Formula I above during the first stage. The presence of a minimal amount of ammonia is assured in the said first stage by supplying the same in the gaseous form thereof in the presence of a solvent in which the ammonia is sparingly soluble.

The ammonolysis of compounds of Formula I above within the purview of the present invention can be effected by any suitable technique. For example, a slow stream of ammonia gas can be continuously passed through the reaction medium. Alternatively, the reaction can be effected in a closed system. Thus, the starting materials can be placed in an autoclave and the ammonia gas thereafter, provided therein under slight pressure. Preferably, in such a preparative technique, the pressure is maintained above about ½ atmosphere, preferably in the range from about ½ atmosphere to 2 atmospheres.

Any conveniently available solvent which does not solubilize ammonia to an appreciable extent and which is capable of dissolving compounds of Formula I above to a degree suitable for the purposes of the present invention may be employed in the first stage. By utilizing such type solvents, cleavage of the labile acyl group of Formula I above by ammonia is minimized thereby precluding the formation of an excessive amount of unwanted side products.

Among the solvents suitable for the purposes of the first stage of the present invention may be included esters of lower alkanoic acids such as ethyl acetate and butyl acetate, hydrocarbons such as benzene, toluene, petroleum ether and the like, tetrahydrofuran, chlorinated hydrocarbons such as chlorobenzene, dichloromethane, chloroform and the like and mixtures thereof with each other as well as with ethers such as ethyl ether. Any suitable temperature may be employed during the critical first stage of the process of the present invention. However, it should be evident that a suitable temperature is any temperature for example which would avoid liquifying and/or increasing the solubility of the ammonia in the solvent medium selected. Preferably, the first stage of the reaction is effected at about room temperature or below room temperature.

In the second stage of the process of the present invention, the compounds of Formula II above are cyclized to the corresponding benzodiazepine of the formula

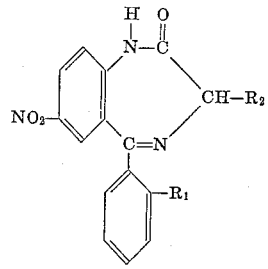

III wherein $R_1$ and $R_2$ have the same meaning as ascribed thereto hereinabove.

As can be seen from a comparison of the formulae of compounds of Formula II above and compounds of Formula III above, the cyclization comprises dehydration of the benzophenone compound of Formula II above. The dehydration can be effected by heating the benzophenone compound, preferably, after first converting the same to a salt, e.g., a salt with a mineral acid such as a hydrohalic acid, for example, hydrochloric acid. The heating can be effected in the presence of a solvent or in the absence of a solvent. In one embodiment, the dehydration can be effected by mixing a benzophenone of Formula II above in a solvent after first forming a salt thereof and heating the resulting mixture. Numerous different solvents can be used in this stage and chloroform, pyridine and dimethylformamide can be named as illustrative. Other solvents will be obvious to those skilled in the art.

The term "lower alkyl," as used throughout the instant specification, is intended to connote both straight and branched chain lower alkyl groups such as methyl, ethyl, isopropyl and the like. The term "halogen" as utilized throughout the instant specification represents chlorine, bromine, fluorine and iodine.

The following examples are illustrative but not limitative of the methods of the present invention. All temperatures are stated in ° C.

*Example 1*

Into a 5-liter, 3 neck flask equipped with a mechanical stirrer, a gas inlet tube and a reflux condenser provided with a sodium hydroxide drying tube connected to a gas trap, are charged 180 g. (0.454 mole) of finely ground 2-bromo-2'-(2 - chlorobenzoyl)-4'-nitroacetanilide and 3500 cc. of a 1:1 (volume) mixture of ethyl acetate and dichloromethane. The solution is stirred vigorously at room temperature, and a slow stream of ammonia gas is introduced over a period of 7 hours. The reaction mixture is then allowed to stand overnight. A precipitate which forms is filtered off, and the cake is washed twice with 100 cc. of dichloromethane. The filtrate (including the washes) is then evaporated in vacuo. The residue, 2-amino-2'-(2-chlorobenzoyl) - 4'-nitroacetanilide melts at 150–153° dec. The product, recrystallized from ligroin (B.P. 90–120°) melts at 166–168°.

The 156.5 grams of 2-amino-2'-(2-chlorobenzoyl)-4'-nitroacetanilide is dissolved in 4000 cc. of dichloromethane and the solution is cooled with an ice bath. With stirring, approximately 24 percent hydrochloric acid is carefully added until the pH is acid to Congo red paper. Approximately 72 cc. of this hydrochloric acid is required. After stirring for an additional four hours, the solid is filtered. After washing with 200 cc. of ether, the cake is pressed with a rubber dam. The 2-amino-2'-(2-chlorobenzoyl)-4'-nitroacetanilide hydrochloride thus obtained when dried at room temperature in vacuo over $CaCl_2$, is found to have a melting point of 140–150° dec. When the hydrochloride is recrystallized from isopropanol, it melts at 154–156°.

*Example 2*

A mixture of 202 g. (0.544 mole) of 2-amino-2'-(2-chlorobenzoyl)-4 - nitroacetanilide hydrochloride, 54 cc. (0.07 mole) of pyridine and 3 liters of ethanol is allowed to reflux with stirring for 4 hours. At the end of this period, 10 g. of Norit is added. Refluxing and stirring are continued for an additional 15 minutes. The reaction mixture is filtered hot. On cooling the filtrate slowly to 0°, white 5-(2-chlorophenyl) - 7 - nitro-3H-1,4-benzodiazepin-2(1H)-one crystallizes and is found to have a melting point of 235–237°.

146 g. of 5-(2-chlorophenyl)-7-nitro - 3H-1,4-benzodiazepin-2(1H)-one obtained as above is recrystallized by dissolving the same in a refluxing mixture of 2700 cc. of ethanol and 1200 cc. of dichloromethane. When the solution is complete, it is filtered by gravity and the filtrate is heated on a steam bath in order to remove all the dichloromethane. Almost white 5-(2-chlorophenyl)-7-nitro-3H-1,4-benzodiazepin-2(1H)-one having a melting point of 236.5–238.5° separates to cooling the filtrate to 0°.

*Example 3*

Into a five liter, three neck flask are charged 100 g. (0.026 mole) of 2-bromoacetamido-2' - fluoro-5-nitrobenzophenone and 3600 cc. of a 1:1 mixture of ethyl acetate and dichloromethane. The solution is stirred vigorously at room temperature and a slow stream of gaseous ammonia is introduced for 7 hours. 500 cc. of dichloromethane is added and the reaction mixture is allowed to stand overnight. The introduction of gaseous ammonia is resumed for about a period of four hours. The white precipitate which formed is filtered. The cake is slurried with 1000 cc. of hot water, filtered and washed with water until the washings are free of ammonium bromide yielding 2-amino-2' - (2-fluorobenzoyl)-4-nitroacetanilide, M.P. 153–155°.

The original organic mother liquor is evaporated in vacuo. The residue is triturated with 100 cc. of benzene and, on filtration, more 2-amino-2'-(2-fluorobenzoyl)-4'-nitroacetanilide melting at 159–161° is obtained. The product after recrystallization from benzene, melts at 168–170°. 2-amino-2' - (2-fluorobenzoyl)-4'-nitroacetanilide (150 g., 0.473 mole) is dissolved in 4000 cc. of dichloromethane. The slightly turbid solution is clarified by suction filtration. 111 cc. of 8.5 N (0.95 mole) of methanolic hydrogen chloride is added and the mixture is allowed to stand overnight. After cooling, the white precipitate which forms is filtered off and washed with 50 cc. of dichloromethane. The so-washed precipitate is 2-amino-2'-(2-fluorobenzoyl) - 4' - nitroacetanilide hydrochloride which melts at 207–209°. Upon recrystallization from isopropanol, the hydrochloride is found to have a melting point of 213–215°.

*Example 4*

A solution of 150 g. (0.425 mole) of 2-amino-2'-(2-fluorobenzoyl)-4'-nitroacetanilide hydrochloride in 1000 cc. of pyridine is refluxed gently for 15 minutes. The reddish solution is distilled in vacuo. Last traces of pyridine are removed by triturating the residue twice with 200 cc. of cold ethanol and distilling the solvent each time. The crystalline residue is resuspended in 200 cc. of cold ethanol, filtered and washed with 30 cc. of cold ethanol yielding 5-(2-fluorophenyl)-7-nitro-3H-1,4-benzodiazepin-2(1H)-one, M.P. 222–224°.

*Example 5*

Into a three liter, three neck flask are charged 65 g. (0.18 mole) of 2-bromoacetamido-5 - nitrobenzophenone and 2400 cc. of a mixture of 60% ethyl acetate and 40% dichloromethane (v./v.). The solution is stirred vigorously at room temperature while a slow stream of ammonia gas in introduced for 7 hours. 500 cc. of fresh dichloromethane is added and then the reaction mixture is allowed to stand overnight. The introduction of gaseous ammonia is resumed for about 4 hours. A white precipate, which forms, is filtered and washed with 30 cc. of ethyl acetate. The cake is suspended in 1000 cc. of water, stirred, filtered and washed with water until the filtrate is free of ammonium bromide yielding 2-aminoacetamido-5-nitrobenzophenone, M.P. 152–155°. The mother liquor (organic solution) is evaporated in vacuo. The residue, more 2-aminoacetamido-5 - nitrobenzophenone, melts at 154–158°.

The 2-aminoacetamido-5-nitrobenzophenone obtained above is dissolved in 1600 cc. of dichloromethane. Norit (3 g.) is added to the resulting turbid solution which is then filtered. The solution is mixed with 70 cc. (0.192 mole) of a 10% solution of methanolic hydrogen chloride and is allowed to stand overnight. The solution is cooled, filtered, and washed with 20 cc. of dichloromethane. 2-aminoacetamido-5-nitrobenzophenone hydrochloride is obtained as a white precipitate which melts at 195–198°.

Example 6

A solution of 51.34 g. (0.125 mole) of 2-aminoacetamido-5-nitrobenzophenone hydrochloride in 800 cc. of pyridine is refluxed gently for 20 minutes. The dark solution is distilled in vacuo. Last traces of pyridine are removed by treating the residue twice with 100 cc. of ethanol and distilling the solvent each time. The crystalline residue is resuspended in 100 cc. of cold ethanol, filtered, and washed with 15 cc. of ethanol. 5-phenyl-7-nitro-3H-1,4-benzodiazepin-2(1H)-one is obtained melting at 224–226°.

Example 7

A solution of 5.0 kg. of 2-bromoacetamido-5-nitrobenzophenone in 30 l. of dichloromethane was charged to an autoclave and the vessel was pressurized to 10 p.s.i. with gaseous ammonia. The batch was stirred for 12 hours at this pressure while the temperature was maintained at 20° by slight cooling. 30 l. of fresh dichloromethane was then added to the vessel and stirring was resumed for 8 hours longer. The 20° temperature and the 10 p.s.i. ammonia over pressure were maintained during this additional time. The reaction mixture was filtered and the solid was slurried with water to yield, after drying, 2-aminoacetamido-5-nitrobenzophenone, M.P. 153–154°.

Addition of dry hydrogen chloride to the filtrate caused the separation of 2-aminoacetamido-5-nitrobenzophenone hydrochloride.

We claim:

1. In a process for converting by ammonalysis a compound of the formula

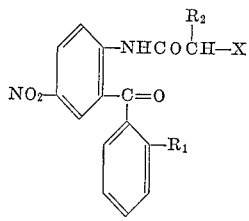

wherein $R_1$ is selected from the group consisting of hydrogen, halogen and trifluoromethyl; $R_2$ is selected from the group consisting of hydrogen and lower alkyl and X is selected from the group consisting of chlorine, bromine and iodine to a compound of the formula

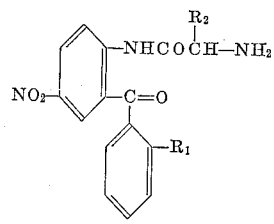

wherein $R_1$ and $R_2$ are as above,
the improvement comprising effecting such conversion in the presence of ammonia gas and a solvent selected from the group consisting of dichloromethane, lower alkyl esters of lower alkanoic acids and mixtures thereof.

2. In a process as defined in claim 1 where the ammonia gas is continuously bubbled through the reaction medium.

3. In a process as defined in claim 1 wherein the reaction is effected in a closed system and the ammonia gas is provided in the closed system under pressure.

References Cited

UNITED STATES PATENTS

| | | | |
|---|---|---|---|
| 2,743,246 | 4/1956 | Lotz | 260—562 X |
| 3,136,815 | 6/1964 | Reeder et al. | 260—562 |

FOREIGN PATENTS

| | | |
|---|---|---|
| 75,915 | 6/1894 | Germany. |

OTHER REFERENCES

Kirk-Othmer Encyclopedia of Chemical Technology, vol. 2, pages 360–61, N.Y., Wiley, 1963.

WALTER A. MODANCE, *Primary Examiner.*

NATALIE TROUSOF, *Assistant Examiner.*